United States Patent
Varma et al.

(10) Patent No.: US 10,023,809 B2
(45) Date of Patent: Jul. 17, 2018

(54) CATALYTIC DEOXYGENATION OF BIO-OILS USING METHANE

(71) Applicant: PURDUE RESEARCH FOUNDATION, West Lafayette, IN (US)

(72) Inventors: Arvind Varma, West Lafayette, IN (US); Yang Xiao, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 73 days.

(21) Appl. No.: 15/223,668

(22) Filed: Jul. 29, 2016

(65) Prior Publication Data

US 2017/0029712 A1 Feb. 2, 2017

Related U.S. Application Data

(60) Provisional application No. 62/199,268, filed on Jul. 31, 2015.

(51) Int. Cl.
*B01J 23/64* (2006.01)
*C10G 3/00* (2006.01)

(52) U.S. Cl.
CPC ....... *C10G 3/47* (2013.01); *C10G 2300/1014* (2013.01); *C10G 2300/1081* (2013.01); *C10G 2300/202* (2013.01); *Y02P 30/20* (2015.11)

(58) Field of Classification Search
None
See application file for complete search history.

(56) References Cited

U.S. PATENT DOCUMENTS

| | | | | |
|---|---|---|---|---|
| 2011/0047864 A1* | 3/2011 | Bhan | ........................ | C10G 1/00 44/307 |
| 2011/0313219 A1* | 12/2011 | Fernando | .................. | C07C 2/76 585/240 |
| 2012/0167876 A1* | 7/2012 | Qiao | ........................ | C13K 1/02 127/37 |

OTHER PUBLICATIONS

Xiao et al., "Catalytic Deoxygenation of Guaiacol Using Methane." ACS Sustainable Chemistry & Engineering, 2015, 2606-2610.*
Gonzalez-Borja, M. A.; Resasco, D. E., "Anisole and Guaiacol Hydrodeoxygenation over Monolithic Pt—Sn Catalysts," Energ Fuel 2011, 25, pp. 4155-4162.

(Continued)

*Primary Examiner* — Philip Louie
(74) *Attorney, Agent, or Firm* — Purdue Research Foundation

(57) ABSTRACT

This disclosure provides a new approach for bio-oil upgrading using methane as reductant instead of hydrogen. Guaiacol, produced by thermal degradation of lignin, represents a model compound for upgrading of fast pyrolysis bio-oils by deoxygenation. To overcome the high cost of $H_2$, methane is used to deoxygenate guaiacol. On Pt/C catalyst, in terms of guaiacol conversion and product distribution, methane is found to exhibit comparable deoxygenation performance as $H_2$. Its lifetime, however, is lower (<3 hrs). In one embodiment, the lifetime of Pt—Bi/C catalyst is extended by addition of bismuth as a promoter.

1 Claim, 5 Drawing Sheets

(56) References Cited

OTHER PUBLICATIONS

Hu, W. B.; Knight, D.; Lowry, B.; Varma, A., "Selective Oxidation of Glycerol to Dihydroxyacetone over Pt—Bi/C Catalyst: Optimization of Catalyst and Reaction Conditions," Ind Eng Chem Res 2010, 49, pp. 10876-10882.

Sun, J. M.; Karim, A. M.; Zhang, H.; Kovarik, L.; Li, X. H. S.; Hensley, A. J.; McEwen, J. S.; Wang, Y., "Carbon-supported bimetallic Pd—Fe catalysts for vapor-phase hydrodeoxygenation of guaiacol," J Catal 2013, 306, pp. 47-57.

* cited by examiner

CATALYTIC DEOXYGENATION OF BIO-OILS USING METHANE

CROSS-REFERENCE TO RELATED APPLICATIONS

The present U.S. patent application is related to and claims the priority benefit of U.S. Provisional Patent Application Ser. No. 62/199,268, filed Jul. 31, 2015, the contents of which is hereby incorporated by reference in its entirety into this disclosure.

TECHNICAL FIELD

The present disclosure generally relates to conversion of biomass to sustainable fuels and chemicals, and in particular to a method for catalytic deoxygenation of bio-oils using methane as a reductant.

BACKGROUND

This section introduces aspects that may help facilitate a better understanding of the disclosure. Accordingly, these statements are to be read in this light and are not to be understood as admissions about what is or is not prior art.

Owing to scarcity of known reserves as well as environmental concerns, increased attention is being paid to developing new fossil or renewable resources, such as shale oil/gas, tar sands and biomass. In particular, biomass has been shown to be an important renewable source, which can be converted into both sustainable fuels and chemicals. Among various techniques for biomass conversion, fast pyrolysis is attractive for bio-oil production, which can subsequently be upgraded to alternative liquid fuels or converted into chemicals. The high oxygen content of bio-oils, however, remains a major challenge, since it decreases stability, combustion performance and heating value of fuels. There is therefore an unmet need for alternate methods for biomass conversion.

SUMMARY

In at least one aspect, a method for deoxygenating a bio-oil is presented. The method can include using methane and a catalyst to deoxygenate the bio-oil.

BRIEF DESCRIPTION OF THE FIGURES

FIG. 2a corresponds to $PtH_2$, FIG. 2b corresponds to $PtCH_4$, FIG. 2c corresponds to $PtBiH_2$, and FIG. 2d corresponds to $PtBiCH_4$.

DETAILED DESCRIPTION

Figure 1A:
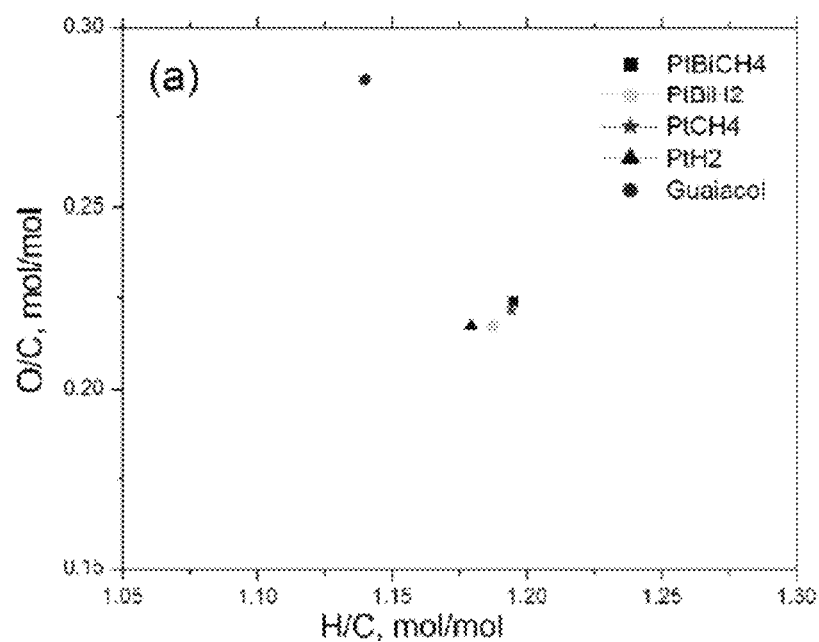
FIG. 1a is a plot of catalyst performance, specifically a Van Krevelen diagram at 60 min time on stream (TOS).

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Hydrodeoxygenation (HDO) is a promising strategy to overcome problems associated with biomass to biofuel conversion. Since bio-oil is a complex mixture, of generally more than 400 chemical species, a model compound is typically used to obtain insight into the HDO process. Guaiacol is one such representative compound owing to its two common oxygenated groups: hydroxyl and methoxyl. Extensive research has been conducted in this field. It should therefore be appreciated that while guaiacol is the model compound used to demonstrate the methods disclosed herein, such use is not intended to be limiting and rather, other biomass compounds can be used. In general, Group VIII metals (Pt, Pd, Ni, Rh, Ru, and so on) are used to activate guaiacol and to facilitate hydrogen donation, while $Al_2O_3$, $ZrO_2$, $SiO_2$ and activated carbon are considered to be effective supports.

Although the use of hydrogen for deoxygenation of guaiacol is advantageous because it generates clean products (mainly water), it often carries high economic penalties arising from its production and transportation. In this context, methane, as the main component in natural gas ($CH_4 > 95\%$) and major component of shale gas (typically $CH_4 > 70\%$), is attractive as an alternative to $H_2$ since it can serve as a hydrogen donor by releasing hydrogen at high temperature on noble metal surfaces, which makes it a potential promising reductant.

To facilitate understanding of the methods disclosed herein, with Pt/C as catalyst, a guaiacol deoxygenation process using $H_2$ is presented herein. Based on kinetics and catalyst characterization, deactivation mechanism and reaction pathways are also proposed. To overcome the high cost of $H_2$, methane is used in the present disclosure to deoxygenate guaiacol.

Results and Discussion:

In preliminary work with Pt/C catalyst, the use of $CH_4$ was shown to be successful for guaiacol deoxygenation, but significant catalyst deactivation was observed. This observation is similar to other works for $CH_4$ reactions and is related to coking/carbon deposition. The deactivation issue has been addressed for other reactions by use of bimetallic catalysts, containing a primary metal and a promoter. Thus, in the present disclosure, a guaiacol deoxygenation process using methane is developed via Pt—Bi catalyst.

Figure 1B:
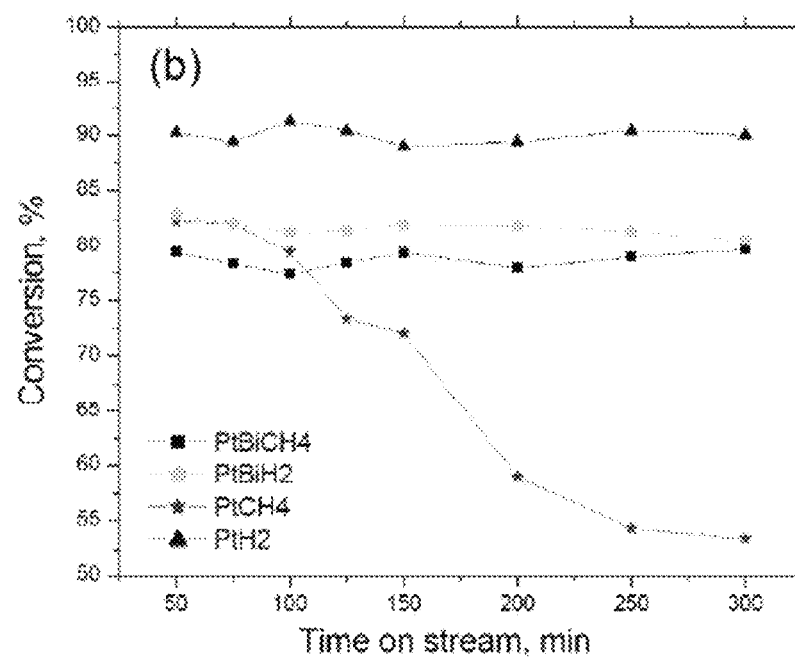
FIG. 1b is a plot showing catalyst performance, specifically conversion vs. TOS.

Four cases ($PtH_2$, $PtCH_4$, $PtBiH_2$ and $PtBiCH_4$), derived from two catalysts (Pt/C, Pt—Bi/C) using either $H_2$ or $CH_4$ as reductant, were tested for deoxygenation of guaiacol under standard operating conditions: 300° C., 1 atm, 0.50 g catalyst, total gas (reductant gas, $H_2$ or $CH_4$:$N_2$=1:1) flow rate 100 mL/min, and guaiacol feed rate 0.025 mL/min (liquid, at room temperature), corresponding to contact time 0.3 g catalyst·hr/g guaiacol. A Van Krevelen diagram (FIG. 1a) is used to evaluate the deoxygenation levels by analyzing O/C and H/C molar ratios in the liquid products, which compares hydrogenation vs. deoxygenation performance. Owing to catalyst deactivation, data taken at 60 min time on stream (TOS) is reported in FIG. 1a. It shows that guaiacol has H/C of 1.14 and O/C of 0.28, implying a high O content. The H/C ratios increase to 1.18-1.20 and O/C ratios decrease to 0.21-0.22 for all the four cases after deoxygenation, indicating that both hydrogenation and deoxygenation occur. It clearly shows that all four cases behave similarly in the early stages of TOS, although the initial conversions of guaiacol vary from 79%-90% (FIG. 1b). The high yield and good stability of PtH$_2$ case have been reported. Since CH$_4$ decomposes on Pt surface donating hydrogen, the PtCH$_4$ case has a high initial guaiacol conversion. In fact, H$_2$ is detected in the gaseous products. As shown in FIG. 1b, with increasing TOS, however, the PtCH$_4$ case exhibits sharp deactivation, while the other three cases maintain good stability. As noted above, a possible reason for rapid deactivation in the PtCH$_4$ case is carbon deposit and/or coking, resulting from CH$_4$ decomposition.

In the PtBiH$_2$ case of FIG. 1b, good stability is obtained although the conversion is decreased by ~10%, as compared to the PtH$_2$ case. Remarkably, PtBiCH$_4$ also shows good catalyst stability, although the conversion is decreased further. For a C$_8$ hydrocarbon reforming process using catalyst containing a Group VIII metal and low amounts of bismuth, a patent disclosed that addition of bismuth extended catalyst lifetime. In fact, this is the only prior work demonstrating catalyst stability using Bi as a promotor for gas-phase reactions at high temperature (>300° C.). Although the mechanism is unclear, our experiments also show that Bi promotor extends catalyst lifetime. It should also be noted that in a patent application, Fernando et al. describe the use of methane with an oxygenate to dehydrate and produce deoxygenated hydrocarbons, but no bimetallic catalysts or data for catalyst stability were reported.

Figure 2A:
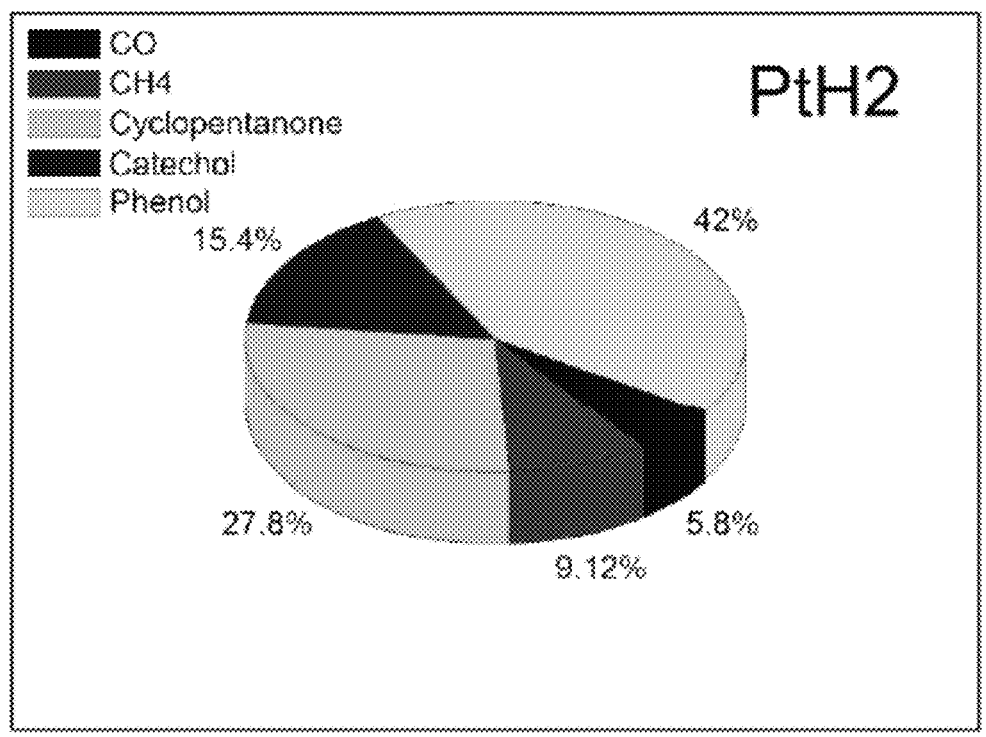
FIGS. 2a-2d show the distribution of major products at 60 min TOS.
Figure 2B:
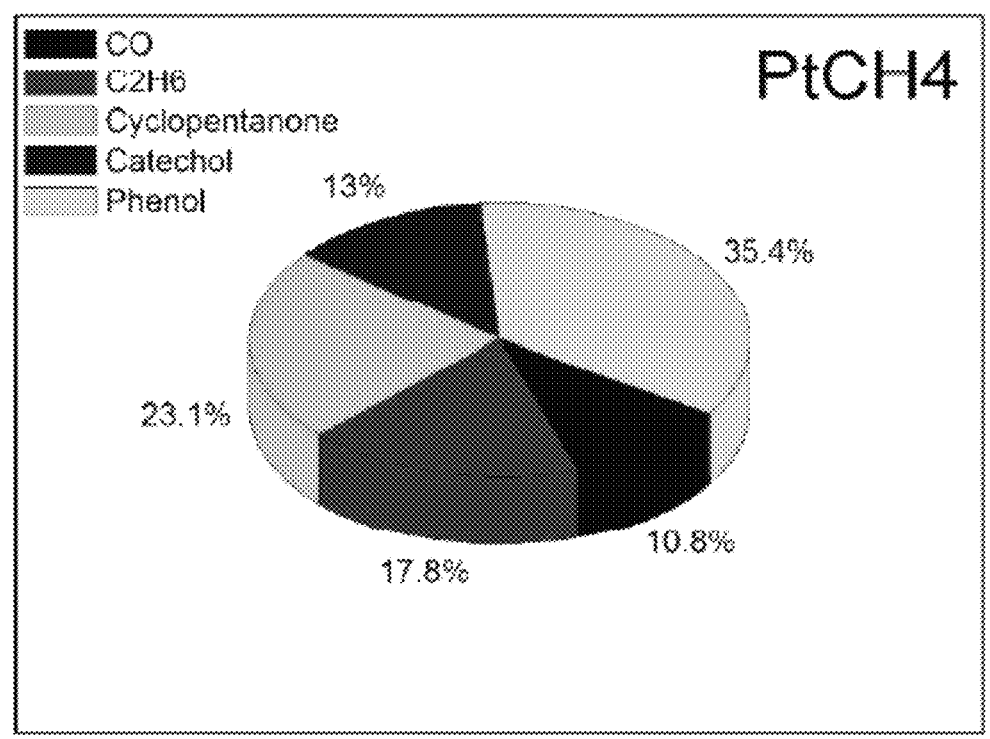
Figure 2C:
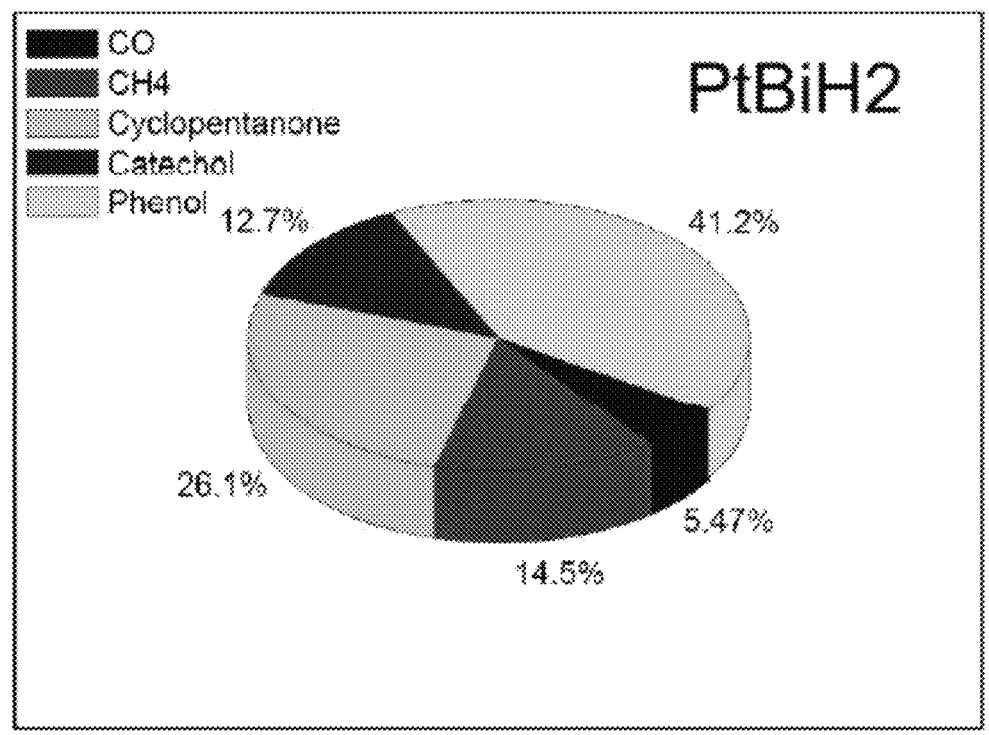
Figure 2D:
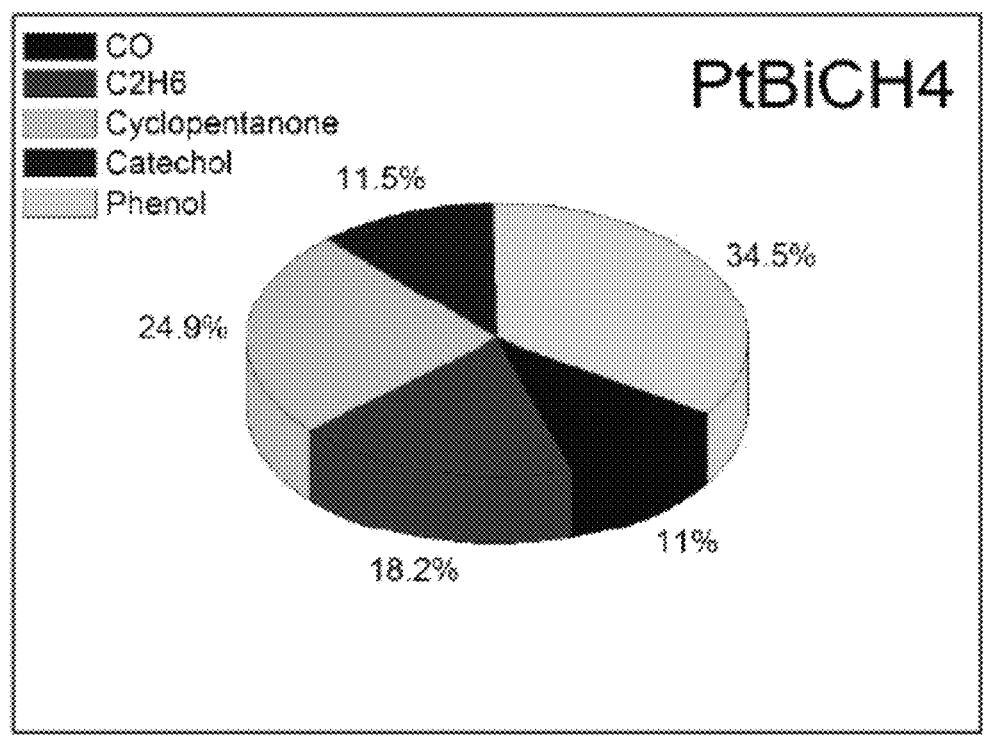

FIGS. 2a-2d show distribution of major components in both gaseous and liquid products at 60 min TOS under standard conditions (FIG. 2a corresponds to PtH$_2$, FIG. 2b corresponds to PtCH$_4$, FIG. 2c corresponds to PtBiH$_2$, and FIG. 2d corresponds to PtBiCH$_4$). Note that components less than 2 wt % are neglected and all compositions are normalized with respect to the remaining components. Only three main products (phenol, catechol and cyclopentanone, total content >95 wt % for all four cases) in the liquid are shown. For liquid products, all four cases have similar distributions and compositions. For gaseous products, the PtH$_2$ and PtBiH$_2$ cases generated CO and CH$_4$, while PtCH$_4$ and PtBiCH$_4$ produced CO and C$_2$H$_6$ instead. Since our work using Pt and H$_2$ suggested that CO and CH$_4$ are generated along with cyclopentanone, we can conclude that C$_2$H$_6$ is generated by the use of CH$_4$. Thus, a conceptual scheme is presented for comparison of H$_2$ and CH$_4$ deoxygenation processes.

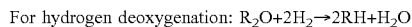
For hydrogen deoxygenation: R$_2$O+2H$_2$→2RH+H$_2$O

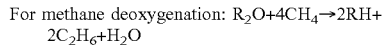
For methane deoxygenation: R$_2$O+4CH$_4$→2RH+ 2C$_2$H$_6$+H$_2$O

It is disclosed that CH$_4$ decomposes on Pt surface and contributes one H atom for guaiacol deoxygenation and water formation, similar to the H$_2$ process, while the residual methyl combines with another methyl to form ethane. This assumption is supported by the low reaction barrier of CH$_4$ decomposition at elevated temperature, along with detected H$_2$ and C$_2$H$_6$ molecules in our experiments.

Figure 3A:
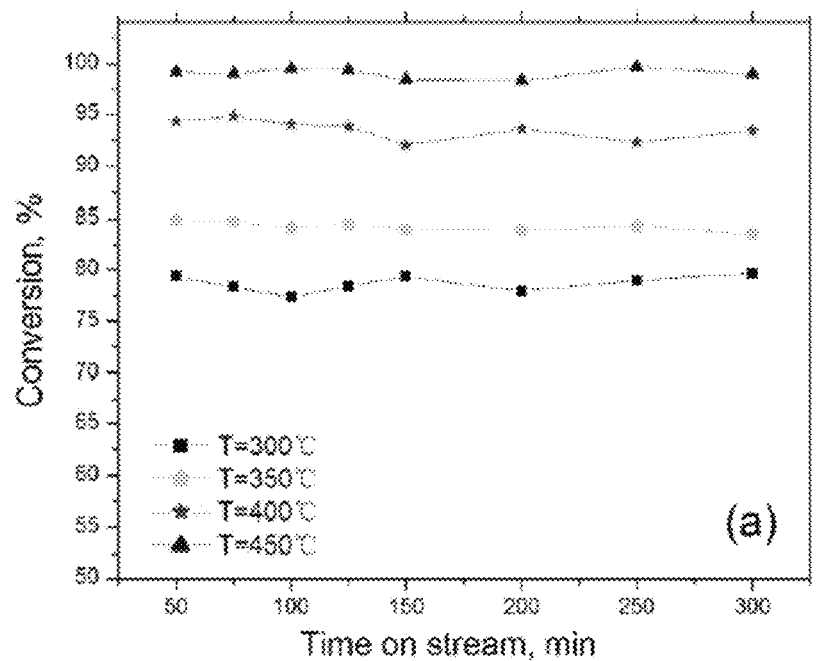
FIG. 3a is a plot showing effect of temperature for Pt—Bi/C catalyst on guaiacol conversion.
Figure 3B:
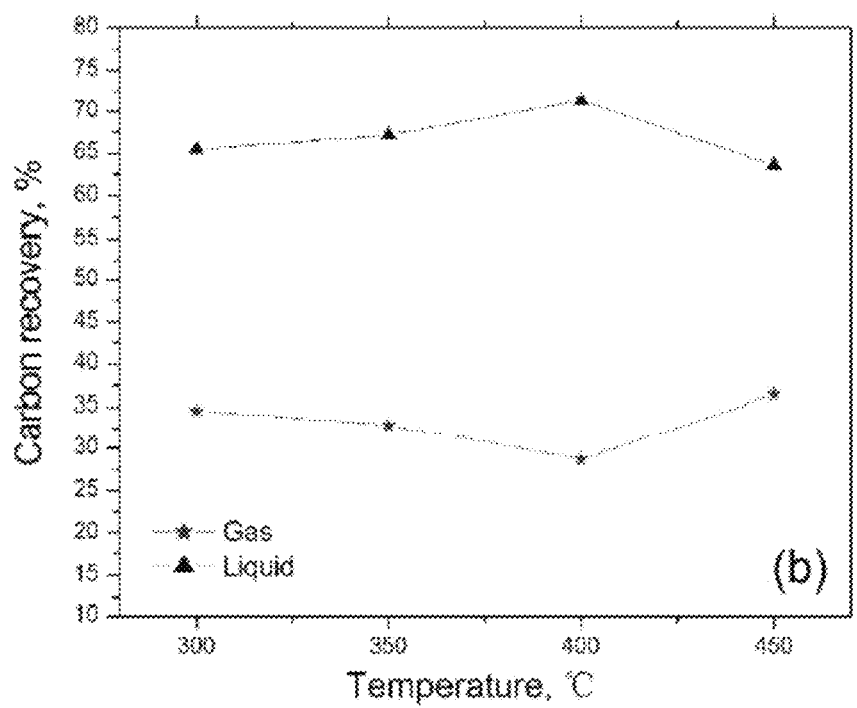
FIG. 3b is a plot showing the effect of temperature for Pt—Bi/C catalyst and carbon recovery in liquid and gaseous products.

To further understand Pt—Bi performance for guaiacol deoxygenation using CH$_4$ as reductant, different temperatures (300-450° C.) were investigated for guaiacol conversion and carbon recovery in liquid and gaseous products, as shown in FIGS. 3a-3b. FIG. 3a shows increase of guaiacol conversion with temperature, where conversions >90% are reached for 400-450° C. Remarkably, as shown in FIGS. 1a and 1b, such conversion is obtained at 300° C. when Pt and H$_2$ are used. Therefore, reaction rate is decreased by either using CH$_4$ as reductant or Pt—Bi as catalyst. Besides guaiacol conversion, carbon recovery in the liquid phase is another important factor to assess the catalyst performance, as shown in FIG. 3b. Two major factors are considered to affect carbon recovery in the liquid phase: guaiacol conversion (to the three main liquid products) and other reactions that decompose guaiacol to produce gaseous products, which occur on carbon-supported noble metal catalysts. Along with temperature increase, carbon recovery in liquid product first increased and then decreased after 400° C., while carbon recovery in gaseous products shows the opposite trend. From the present work, 400° C. can be considered as the optimal temperature accounting for trade-off between guaiacol conversion and carbon recovery in liquid products.

Figure 4:
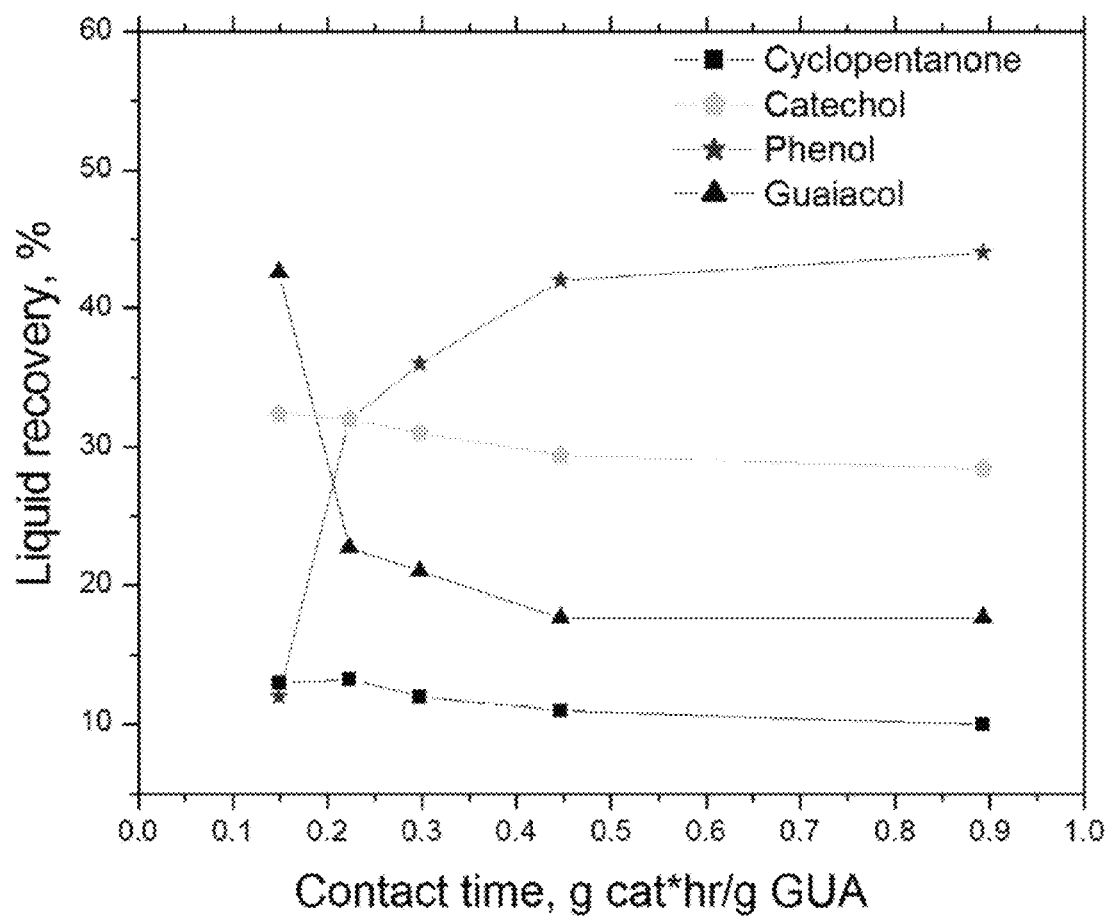
FIG. 4 is a plot showing the kinetic behavior of Pt—Bi catalyst at 400° C.

The kinetic behavior of Pt—Bi catalyst at 400° C. was studied by varying feed rates of guaiacol and CH$_4$ under otherwise standard conditions. The data for each contact time, taken at 60 min TOS, is shown in FIG. 4. It illustrates that phenol, as the main product, rises with contact time increase, while the other two products remain essentially unchanged. As compared to the PtH$_2$ case (FIGS. 1a and 1b; 300° C., 0.3 g catalyst·hr/g guaiacol), the results of FIGS. 3a, 3b and 4 demonstrate that equivalent guaiacol conversion can be achieved for the case of Pt—Bi catalyst with methane by compensating with either higher temperature or longer contact time (>0.5 g catalyst·hr/g guaiacol).

In the present work, CH$_4$ is used as novel reductant to deoxygenate guaiacol, a model compound of pyrolysis bio-oils. With the Pt/C catalyst, CH$_4$ exhibits as good deoxygenation performance as H$_2$ with respect to guaiacol conversion and product distribution. The lifetime of Pt/C catalyst, however, was low (<3 hrs). With addition of bismuth as promoter, the lifetime of Pt—Bi/C is extended (no significant deactivation in 5 hrs), although catalyst performance decreases somewhat, which could be compensated by either higher reaction temperature or longer contact time. The current work provides a new approach for bio-oil upgrading using methane as reductant instead of hydrogen.

Those skilled in the art will recognize that numerous modifications can be made to the specific implementations described above. The implementations should not be limited to the particular limitations described. Other implementations may be possible.

REFERENCES

1. Savaliya, M. L.; Dhorajiya, B. D.; Dholakiya, B. Z. Recent advancement in production of liquid biofuels from renewable resources: a review. *Res Chem Intermediat* 2015, 41, 475-509.
2. Nigam, P. S.; Singh, A. Production of liquid biofuels from renewable resources. *Prog Energ Combust Sci* 2011, 37, 52-68.
3. Bridgwater, A. V. Review of fast pyrolysis of biomass and product upgrading. *Biomass Bioenerg* 2012, 38, 68-94.
4. Tuck, C. O.; Perez, E.; Horvath, I. T.; Sheldon, R. A.; Poliakoff, M. Valorization of Biomass: Deriving More Value from Waste. *Science* 2012, 337, 695-699.
5. Shrotri, A.; Tanksale, A.; Beltramini, J. N.; Gurav, H.; Chilukuri, S. V. Conversion of cellulose to polyols over promoted nickel catalysts. *Catal Sci Technol* 2012, 2, 1852-1858.
6. Huber, G. W.; Iborra, S.; Corma, A. Synthesis of transportation fuels from biomass: Chemistry, catalysts, and engineering. *Chemical Reviews* 2006, 106, 4044-4098.
7. Meier, D.; van de Beld, B.; Bridgwater, A. V.; Elliott, D. C.; Oasmaa, A.; Preto, F. State-of-the-art of fast 7. pyrolysis in IEA bioenergy member countries. *Renew Sust Energ Rev* 2013, 20, 619-641.
8. Dickerson, T.; Soria, J. Catalytic Fast Pyrolysis: A Review. *Energies* 2013, 6, 514-538.
9. Hu, X.; Mourant, D.; Gunawan, R.; Wu, L. P.; Wang, Y.; Lievens, C.; Li, C. Z. Production of value-added chemicals from bio-oil via acid catalysis coupled with liquid-liquid extraction. *RSC Advances* 2012, 2, 9366-9370.
10. Ramsurn, H.; Gupta, R. B. Nanotechnology in Solar and Biofuels. *Acs Sustain Chem Eng* 2013, 1, 779-797.
11. Xiu, S. N.; Shahbazi, A. Bio-oil production and upgrading research: A review. *Renew Sust Energ Rev* 2012, 16, 4406-4414.
12. Mortensen, P. M.; Grunwaldt, J. D.; Jensen, P. A.; Knudsen, K. G.; Jensen, A. D. A review of catalytic upgrading of bio-oil to engine fuels. *Appl Catal a-Gen* 2011, 407, 1-19.
13. Furimsky, E. Catalytic hydrodeoxygenation. *Appl Catal a-Gen* 2000, 199, 147-190.
14. Elliott, D. C.; Wang, H. M. Hydrocarbon Liquid Production via Catalytic Hydroprocessing of Phenolic Oils Fractionated from Fast Pyrolysis of Red Oak and Corn Stover. *Acs Sustain Chem Eng* 2015, 3, 892-902.
15. Zhao, H. Y.; Li, D.; Bui, P.; Oyama, S. T. Hydrodeoxygenation of guaiacol as model compound for pyrolysis oil on transition metal phosphide hydroprocessing catalysts. *Appl Catal a-Gen* 2011, 391, 305-310.
16. Bui, V. N.; Laurenti, D.; Afanasiev, P.; Geantet, C. Hydrodeoxygenation of guaiacol with CoMo catalysts. Part I: Promoting effect of cobalt on HDO selectivity and activity. *Appl Catal B-Environ* 2011, 101, 239-245.
17. Gutierrez, A.; Kaila, R. K.; Honkela, M. L.; Slioor, R.; Krause, A. O. I. Hydrodeoxygenation of guaiacol on noble metal catalysts. *Catal Today* 2009, 147, 239-246.
18. Lee, C. R.; Yoon, J. S.; Suh, Y. W.; Choi, J. W.; Ha, J. M.; Suh, D. J.; Park, Y. K. Catalytic roles of metals and supports on hydrodeoxygenation of lignin monomer guaiacol. *Catal Commun* 2012, 17, 54-58.
19. Nimmanwudipong, T.; Runnebaum, R. C.; Block, D. E.; Gates, B. C. Catalytic Conversion of Guaiacol Catalyzed by Platinum Supported on Alumina: Reaction Network Including Hydrodeoxygenation Reactions. *Energ Fuel* 2011, 25, 3417-3427.
20. Zhang, W.; Chen, J. Z.; Liu, R. L.; Wang, S. P.; Chen, L. M.; Li, K. G. Hydrodeoxygenation of Lignin-Derived Phenolic Monomers and Dimers to Alkane Fuels over Bifunctional Zeolite-Supported Metal Catalysts. *Acs Sustain Chem Eng* 2014, 2, 683-691.
21. Bu, Q.; Lei, H. W.; Zacher, A. H.; Wang, L.; Ren, S. J.; Liang, J.; Wei, Y.; Liu, Y. P.; Tang, J.; Zhang, Q.; Ruan, R. A review of catalytic hydrodeoxygenation of lignin-derived phenols from biomass pyrolysis. *Bioresource Technol* 2012, 124, 470-477.
22. Wu, S. K.; Lai, P. C.; Lin, Y. C.; Wan, H. P.; Lee, H. T.; Chang, Y. H. Atmospheric Hydrodeoxygenation of Guaiacol over Alumina-, Zirconia-, and Silica-Supported Nickel Phosphide Catalysts. *Acs Sustain Chem Eng* 2013, 1, 349-358.
23. Stocker, M. Biofuels and Biomass-To-Liquid Fuels in the Biorefinery: Catalytic Conversion of Lignocellulosic Biomass using Porous Materials. *Angew Chem Int Edit* 2008, 47, 9200-9211.
24. Li, Y. D.; Li, D. X.; Wang, G. W. Methane decomposition to COx-free hydrogen and nano-carbon material on group 8-10 base metal catalysts: A review. *Catal Today* 2011, 162, 1-48.
25. Gao, D.; Schweitzer, C.; Hwang, H. T.; Varma, A. Conversion of guaiacol on noble metal catalysts: reaction performance and deactivation studies. *Ind Eng Chem Res* 2014.
26. Zhang, Y.; Smith, K. J. Carbon formation thresholds and catalyst deactivation during CH4 decomposition on supported Co and Ni catalysts. *Catal Lett* 2004, 95, 7-12.
27. Gonzalez-Borja, M. A.; Resasco, D. E. Anisole and Guaiacol Hydrodeoxygenation over Monolithic Pt—Sn Catalysts. *Energ Fuel* 2011, 25, 4155-4162.
28. Bui, V. N.; Laurenti, D.; Delichere, P.; Geantet, C. Hydrodeoxygenation of guaiacol Part II: Support effect for CoMoS catalysts on HDO activity and selectivity. *Appl Catal B-Environ* 2011, 101, 246-255.
29. Innes, R. A.; Sugimoto, M.; Fukunaga, T. Reforming process using monofunctional catalyst containing bismuth. U.S. Pat. No. 5,851,379. 1998.
30. Sun, J. M.; Karim, A. M.; Zhang, H.; Kovarik, L.; Li, X. H. S.; Hensley, A. J.; McEwen, J. S.; Wang, Y. Carbon-supported bimetallic Pd—Fe catalysts for vapor-phase hydrodeoxygenation of guaiacol. *J Catal* 2013, 306, 47-57.
31. Alonso, D. M.; Wettstein, S. G.; Dumesic, J. A. Bimetallic catalysts for upgrading of biomass to fuels and chemicals. *Chem Soc Rev* 2012, 41, 8075-8098.
32. Maris, E. P.; Ketchie, W. C.; Murayama, M.; Davis, R. J. Glycerol hydrogenolysis on carbon-supported PtRu and AuRu bimetallic catalysts. *J Catal* 2007, 251, 281-294.
33. Hu, W. B.; Knight, D.; Lowry, B.; Varma, A. Selective Oxidation of Glycerol to Dihydroxyacetone over Pt—Bi/C Catalyst: Optimization of Catalyst and Reaction Conditions. *Ind Eng Chem Res* 2010, 49, 10876-10882.
34. Krevelen, D. V. Graphical-statistical method for the study of structure and reaction processes of coal. *Fuel* 1950, 29, 269.
35. Wang, S. B.; Lu, G. Q. Catalytic activities and coking characteristics of oxides-supported Ni catalysts for CH4 reforming with carbon dioxide. *Energ Fuel* 1998, 12, 248-256.
36. Ermakova, M. A.; Ermakov, D. Y.; Kuvshinov, G. G.; Plyasova, L. M. New nickel catalysts for the formation of filamentous carbon in the reaction of methane decomposition. *J Catal* 1999, 187, 77-84.
37. Fernando, S.; Gunawardena, D. A. Deoxygenation of biomass derived oxygenates to hydrocarbons via direct methane intervention. U. S. Patent Application No. US 2011/0313219 A1. 2011.

The invention claimed is:

1. A method for deoxygenating a bio-oil, comprising using methane and a catalyst to deoxygenate the bio-oil, wherein the catalyst is a Pt—Bi/C bimetallic catalyst.

* * * * *